(12) United States Patent
Buettgenbach

(10) Patent No.: US 6,485,143 B2
(45) Date of Patent: Nov. 26, 2002

(54) OCULAR

(76) Inventor: Johannes Buettgenbach, Herweg 56, 51429 Bergisch Gladbach (DE)

( * ) Notice: Subject to any disclaimer, the term of this patent is extended or adjusted under 35 U.S.C. 154(b) by 0 days.

(21) Appl. No.: 09/870,660

(22) Filed: Jun. 1, 2001

(65) Prior Publication Data

US 2002/0071176 A1 Jun. 13, 2002

(30) Foreign Application Priority Data

Dec. 13, 2000 (EP) .............................. 00127319

(51) Int. Cl.$^7$ .............................................. G02B 23/00
(52) U.S. Cl. ..................... 351/399; 359/407; 359/480; 351/57; 351/158
(58) Field of Search .................... 359/407–411, 418, 359/399, 480–482, 808–819; 351/158, 57

(56) References Cited

U.S. PATENT DOCUMENTS

| | | | | |
|---|---|---|---|---|
| 3,741,634 A | * | 6/1973 | Stoltze .......................... 351/57 |
| 3,865,468 A | * | 2/1975 | Holcomb ...................... 351/158 |
| 4,886,340 A | * | 12/1989 | Kanda ......................... 359/480 |
| 5,448,318 A | * | 9/1995 | Heine et al. ................. 351/245 |
| 5,541,767 A | * | 7/1996 | Murphy et al. ............. 359/399 |
| 6,172,808 B1 | * | 1/2001 | Foreman et al. ............ 359/481 |

* cited by examiner

Primary Examiner—Thong Nguyen
(74) Attorney, Agent, or Firm—Diller, Ramik & Wight

(57) ABSTRACT

An ocular comprises two magnifying mechanisms (10, 12) each having at least two lenses (22, 24). The two magnifying mechanisms (10, 12) are arranged in front of human eyes and are connected via fasteners (40) to a supporting portion (14) of a frame. The frame includes a holding portion (16) for holding the ocular on a human head. The two magnifying mechanisms (10, 12) are attached via the fasteners (40) to the supporting portion (14) of the frame.

8 Claims, 3 Drawing Sheets

OCULAR

BACKGROUND OF THE INVENTION

The invention relates to an ocular, such as binoculars or opera glasses.

Known binoculars and opera glasses must be held by hand before a user's eyes. If the user cannot support his arms, it is not possible to keep the magnifying glass steady. This leads to a blurred picture seen by the user. In particular over an extended period of time holding of such magnifying glasses leads to exhaustion and thus to stronger shaking of the arms.

SUMMARY OF THE INVENTION

It is an object of the present invention to provide an easy-to-handle ocular which prevents the arms from exhausting.

The ocular according to the present invention comprises a magnifying device connected with a frame. Said magnifying device comprises at least two lenses per optical path. Thus at least two lenses are arranged in front of each human eye, the lenses magnifying the image viewed. The frame comprises a holding portion and a supporting portion. The holding portion is configured for holding the ocular on the human head and the supporting portion is configured for supporting the magnifying device.

Since the ocular according to the present invention is adapted to be directly fastened to the human head by means of the holding portion, it is no longer necessary that the user holds the ocular in his hands. Exhaustion of the arms caused by the force required to hold the ocular does not longer occur. The impression of a blurred image shown by known oculars is due to the fact that a relative movement takes place between the human eye and the ocular. Since the ocular according to the present invention is fastened to the human head by means of the holding portion, no relative movement takes place between the magnifying device and the human eye such that the user does not see a blurred image.

Further, the ocular according to the present invention offers the advantage that the user can move his head in any direction with the ocular following that movement. Another advantage is that the hands of the user are free.

The frame of the ocular according to the invention may be a kind of spectacle frame, wherein the holding portions serve as the spectacle sidepieces. Such a configuration allows the ocular to be easily put on and taken off like spectacles. The bridge of the spectacles, which corresponds to the supporting portion, may be provided with nose pads.

Preferably, the magnifying device is adapted to be fastened via an attachable fastening means to the supporting portion. Said fastening means can be provided on the magnifying device or the supporting means. Thus the magnifying device is adapted to be fastened by simple attachment to the supporting portion and removed by simple detachment from the supporting portion to allow transport of the ocular.

The fastening means are preferably configured as detachable snap-in means. This prevents unintended detachment of the magnifying device from the supporting means such that the magnifying device remains rigidly connected with the supporting means even in the event of stronger movements of the head.

To facilitate attachment of the magnifying device to and detachment of the magnifying device from the supporting portion, the fastening means preferably comprises at least one elastic fastening arm having a snap-in pin. When the magnifying device is attached or detached, the elastic arm is bent out of its initial position and returns to its initial position when the magnifying device has been completely attached to or completely detached from the supporting portion. To ensure that the magnifying device is securely held on the supporting portion, the snap-in pin may e.g. engage on recesses provided on the supporting portion. Preferably, the supporting portion is configured such that the fastening arm at least partially embraces the supporting portion. Special recesses on the supporting portion for engagement by the snap-in pins are not required.

Preferably, the fastening means comprises two snap-in arms of elastic configuration, each arm comprising a snap-in pin. This facilitates attachment of the magnifying device to and detachment of the magnifying device from the supporting portion.

In a particularly preferred embodiment the magnifying device comprises two magnifying means, each magnifying means being arranged in front of one eye. These are preferably two magnifying means which can be handled independently of each other. Said magnifying means may be of identical configuration and are individually attachable to the supporting portion. Thus the two magnifying means can be directly attached, independently of each other, to the supporting portion such that they are arranged in front of the respective eye. The ocular according to the invention is thus adjustable to the interpupillary distance of the individual users.

Each magnifying device comprises two lenses arranged in the optical path of the human eye. For focus adjustment the lenses are adapted to be displaced relative to each other. This displacement can be carried out by means of a rack and a focussing wheel. Further, an electrical focussing can be provided, wherein the distance between the two lenses is adjusted e. g. by a motor-driven screw-and-nut system. Electrical focussing offers the advantage that automatic focussing in the form of an autofocus system can be provided. When a user of the ocular according to the invention has a vision defect, this defect is usually compensated for by the lenses of the ocular so that, prior to using the autofocus system, the distance between the two lenses must be adjusted such that the vision defect is balanced out. Then continuous focussing using an autofocus system can be performed.

In another preferred embodiment the magnifying means are not attached but articulated to the supporting portion. This allows the magnifying means to be folded when the ocular is to be transported such that the ocular has a small transport size.

For secure fastening of the magnifying means to the frame or the supporting portion of the frame a reinforcing bar may additionally be provided, the bar extending from the magnifying means to the frame thus ensuring lateral stabilization of the magnifying means. The ends of the reinforcing bar are removably connected either with the frame or with the magnifying means such that, according to the embodiment, the magnifying means can be either detached or folded after removal of the reinforcing bar.

Preferably, the fastening means for the magnifying devices to be attached to the supporting portion are configured such that the magnifying devices can be attached to normal spectacles. In this case the magnifying means or the lens arranged nearer to the eye would be located between the eye and the lens of the normal spectacles. Further, it is possible to configure the fastening means of the magnifying device such that the two magnifying means are arranged in front of the lens of the normal spectacles. Arrangement of the lens of the normal spectacles between the two magnifying means offers the advantage that the spectacle frame is securely held on the human head and does not tilt due to the additional weight.

Another preferred embodiment solving the object of the present invention, i.e. to provide an easy-to-handle ocular, relates to a second pair of lenses attachable to normal spectacles. In this embodiment the ocular according to the invention comprises at least two lenses per optical path, i.e. at least two lenses are arranged in front of each eye. Further, the ocular comprises a frame having a holding portion for holding the ocular on the human head. This holding portion may be a normal spectacle frame. A first pair of lenses is connected with the holding portion of the frame, the pair of lenses comprising one lens per optical path such that one lens of the pair of lenses is arranged in front of each eye as in the case of normal spectacles. In front of the first pair of lenses a second pair of lenses also having one lens per optical path is arranged.

According to the invention the second pair of lenses is removably connected via fastening elements with the holding portion of the frame. Said fastening elements are arranged on the outside of the lenses of the second and the first pair of lenses. Since at least two fastening elements are provided and these elements are located on the outside of the pairs of lenses, said fastening elements are arranged at as large a distance as possible to each other. This ensures good stability of the connection between the second pair of lenses and the holding portion of the frame.

Further, another fastening element may be provided between the two lenses of the two pairs of lenses. Said fastening element connects the two bridges arranged between the lenses of a pair of lenses.

Preferably, the fastening elements are configured such that the distance between the two pairs of lenses is adjustable. Easy adjustment of the distance between the two pairs of lenses allows easy focussing of the magnified picture. Preferably, the fastening elements are fastened to the sidepieces of the frame such that they are adapted to be displaced. For this purpose the fastening elements may be configured such that they at least partially embrace the sidepieces of the frame. Due to the elasticity of the portions of the fastening elements embracing the sidepieces of the frame an adequate friction can be produced such that the second pair of lenses, relative to the first pair of lenses, can, on the one hand, be easily displaced by hand and, on the other hand, remains in the adjusted position when the ocular is taken off. Maladjustment of the distance between the two pairs of lenses due to slipping can be prevented by providing an additional fixing means, such as a screw or a snap-in means.

In a particularly preferred embodiment of the ocular according to the invention the frame comprises a drive unit and a focussing unit. The drive unit allows the distance between the two pairs of lenses to be automatically adjusted. The additionally provided focussing unit allows this adjustment to be effected automatically in such a way that the viewer always sees a sharply defined, i.e. automatically focussed, image.

As in the case of the preferred methods of connecting the magnifying device with the supporting portion described above, the fastening elements can, in the present embodiment, be configured e.g. with snap-in pins and similar parts.

BRIEF DESCRIPTION OF THE DRAWINGS

Hereunder preferred embodiments are explained in detail with reference to the drawings in which.

DESCRIPTION OF THE PREFERRED EMBODIMENTS

Figure 1:
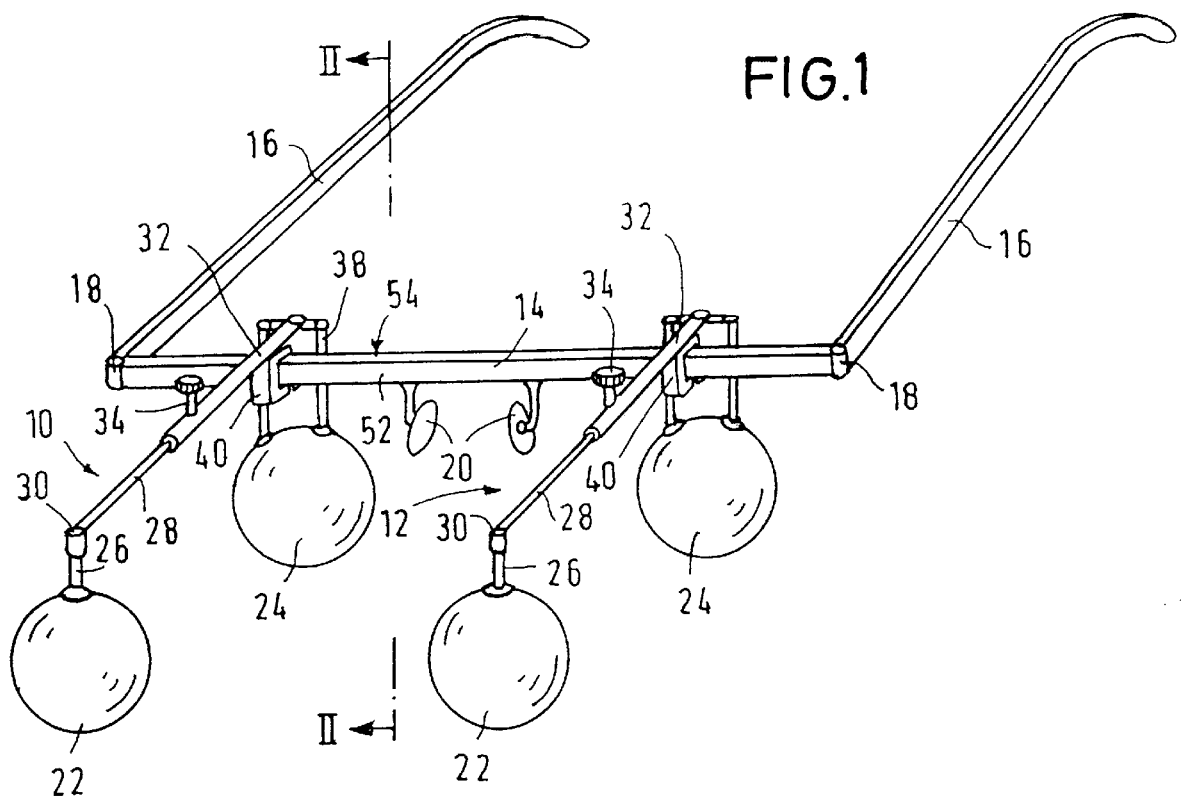
FIG. 1 shows a schematic perspective view of a first embodiment of the ocular.
Figure 2:
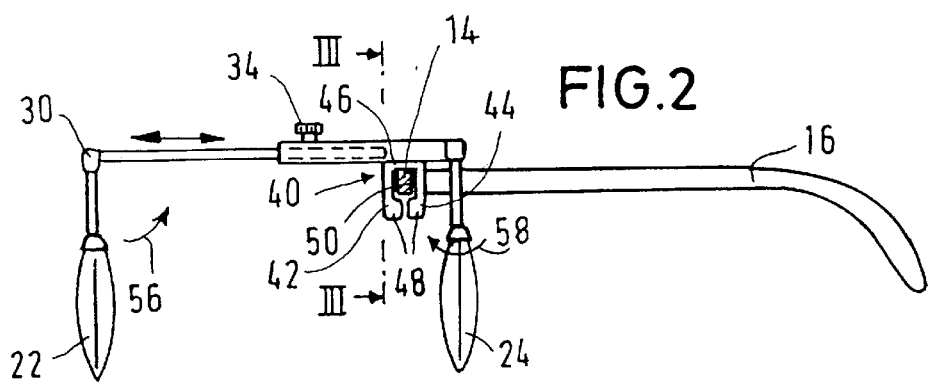
FIG. 2 shows a sectional view along line II—II of FIG. 1.
Figure 3:
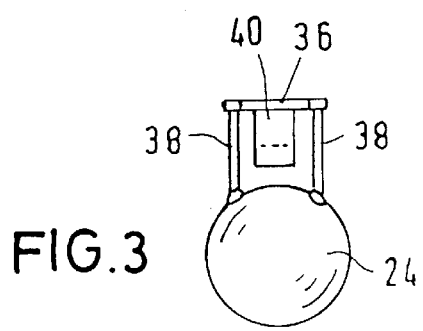
FIG. 3 shows a sectional view along line III—III of FIG. 2.

The embodiment shown in FIGS. 1–3 comprises two magnifying means 10,12 fastened to a supporting portion 14 of a frame. The frame further comprises two holding portions 16 configured as spectacle sidepieces. Said holding portions 16 are connected via hinges 18 with the supporting portion 14. The supporting portion 14 is of essentially straight configuration and has a rectangular cross-section. Further, the supporting portion 14 is provided with nose pads 20 for supporting the frame on the human nose.

The two magnifying means 10,12 are of identical configuration. Each magnifying means 10,12 comprises two lenses 22,24. The lens 22 is connected via a spacer 26 with a bar 28. The length of the spacer 26 is selected such that the lens 22 is arranged at the level of the human eye. For the purpose of transport, which is described later, the spacer 26 is connected via a hinge 30 with the bar 28. The bar 28 has a round cross-section and is guided in a holding tube 32, the inner diameter of the holding tube 32 corresponding to the outer diameter of the bar 28. The cross-section of the bar 28 and the holding tube 32 may also be rectangular or have any other shape. To adjust the distance between the two lenses 22,24 the bar 28 is adapted to be displaced in the holding tube 32. For fixing the distance a clamping screw 34 is provided.

The lens 24 is fastened to the end of the holding tube 32 facing the human eye. For this purpose a crosspiece 36 is articulated to the holding tube 32 such that the crosspiece 36 can be pivoted about its longitudinal axis. At each outer end of the crosspiece 36 a spacer 38 is provided which is connected with the lens 24 (FIG. 3).

For fastening the magnifying means 10,12 each magnifying means 10,12 comprises a fastening means 40. Said fastening means 40 comprises two elastic fastening arms 42,44 which are connected with each other via a crosspiece 46. Said crosspiece 46 is permanently connected with the holding tube 32. At the ends of the fastening arms 42,44 averting the crosspiece 46 a snap-in pins 48 are provided. The two snap-in pins 48 point towards each other.

When the magnifying means 10,12 are attached to the supporting portion 14, the two fastening arms 42,44 are pressed apart. When the magnifying means 10,12 are fully attached to the supporting portion 14, the elastic fastening arms 42,44 return to their initial position such that the snap-in pins 48 at least partially embrace the supporting portion 14. To facilitate attachment and detachment of the magnifying means 10,12 the supporting portion 14 may comprise a tapered section.

For adjustment of the horizontal distance between the two magnifying means 10,12 the fastening means 40 comprise sliding surfaces 50 on the inner side of the fastening arms 42,44. Said sliding surfaces 50 bear upon the front side 52 and the rear side 54 of the supporting portion 14.

For transporting the ocular the two magnifying means 10,12 are removed from the supporting portion 14 by being moved in upward direction, as shown in FIG. 2. For this purpose the fastening arms 42,44 are pressed apart. Then the lens 22 is pivoted to the right in the direction indicated by arrow 56 (FIG. 2). The lens 24 is pivoted to the left about the articulated crosspiece 36 in the direction shown by arrow 58 in FIG. 2. To allow pivoting of the lens 24, the lens 24 is connected via two spacers 38 and the crosspiece 36 with the holding tube 32 such that the fastening means 40 is arranged between the two spacers 38 when the lens 24 is pivoted (FIG. 3).

The two folded magnifying means 10,12 are of a very small size and can e.g. be placed into a case. The frame is folded, like a spectacle frame, at the hinges 18, with the two holding portions 16 being folded to the inside.

Figure 4:
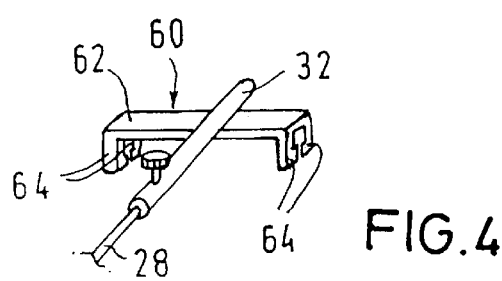
FIG. 4 shows a schematic view of an embodiment of a fastening means of a magnifying means.

For increasing the stability when the magnifying means 10,12 are fastened to the supporting portion 14, the fastening means 60 shown in FIG. 4 may be provided. Said fastening means 60 is connected, like the fastening means 40, with the holding tube 32. The fastening means 60 comprises a crosspiece 62 extending orthogonally to the holding tube 32. At both ends of the crosspiece 62 two fastening arms 64 are provided which extend downwards towards the supporting portion 14. Said fastening arms 64 are configured like the fastening arms 42,44 and also comprise snap-in pins.

The fastening portion 60 ensures that the magnifying means 10,12 are more rigidly connected with the supporting portion 14. The fastening portion 60 prevents in particular wobbling of the magnifying means 10,12 in the horizontal plane. In all other respects magnifying means provided with the fastening means 60 are connected with the supporting portion 14 in the same manner as described above.

Figure 5:
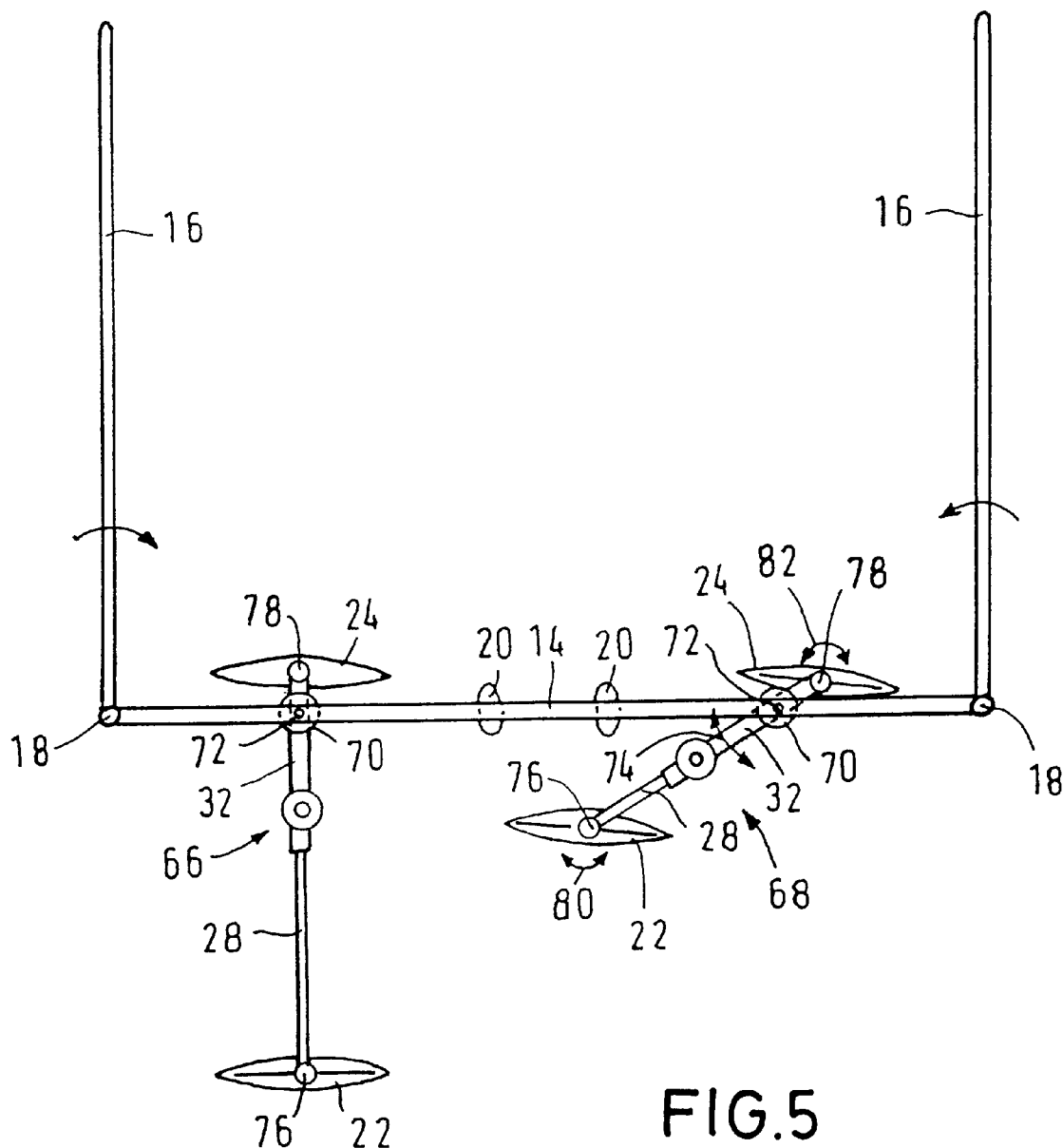
FIG. 5 shows a schematic top view of a second embodiment of the ocular.

In the embodiment shown in FIG. 5 the elements corresponding to those of the embodiments described above bear the same reference numerals. The essential difference is the type of fastening magnifying means 66,68. Said magnifying means 66,68 are of identical configuration but not attachable to the supporting portion 14. Rather, the holding tube 32 is permanently connnected via a fastening bar 70 with the supporting portion 14. Said fastening bar 70 is configured such that the magnifying means 66,68 are adapted to be pivoted in the direction indicated by arrow 74 about an axis 72 extending orthogonally to the supporting portion 14.

The lenses 22,24 are also pivotably connected with the bar 28 and the holding tube 32, respectively. The pivoting axes 76,78 extend parallel to the pivoting axes 72. The lenses 22,24 are thus pivotable about the pivoting axes 76 and 78, respectively, in the direction indicated by arrows 80 and 82, respectively.

By folding the magnifying means 66,68 to the inside, i.e. towards the supporting portion 14, the transport size of the ocular can be reduced. When the magnifying means 66,68 are folded to the inside, the lenses 22,24 extend essentially parallel to the supporting portion 14. The holding portions 16 can be folded at the hinges 18 to the inside towards the supporting portion 14, as in the first embodiment.

Figure 6:
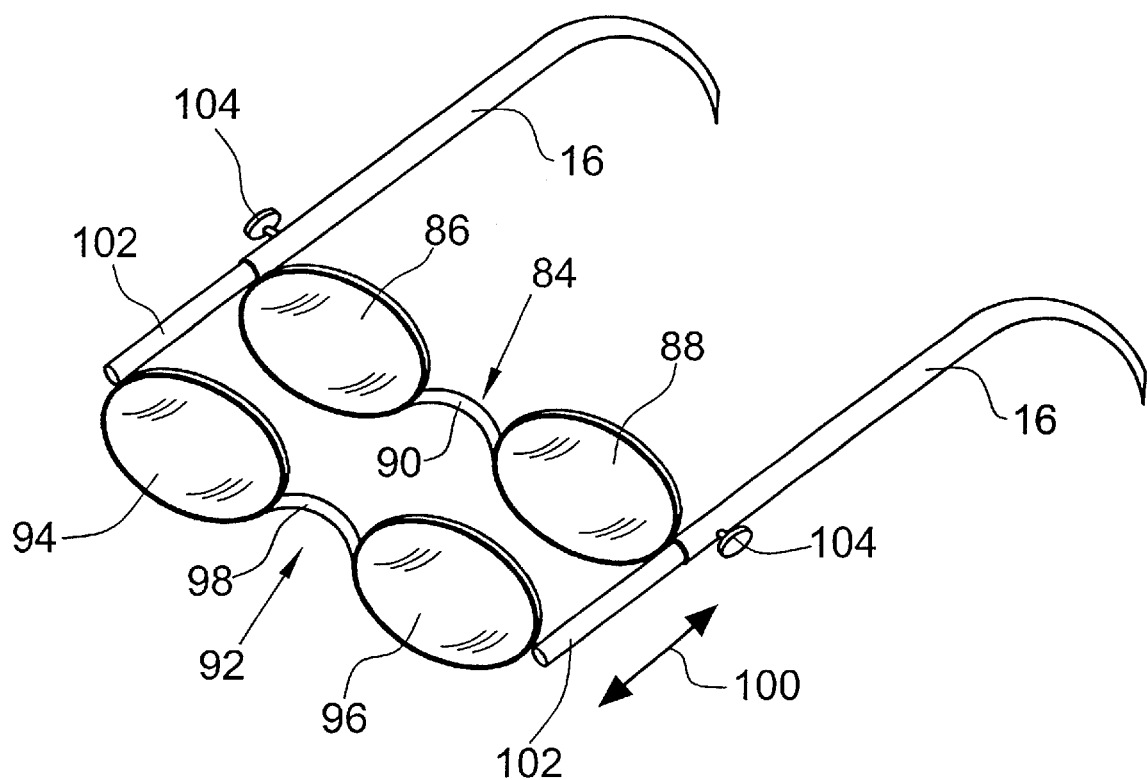
FIG. 6 shows a schematic perspective view of a third embodiment of the ocular.

The embodiment shown in FIG. 6 comprises a frame having two holding portions 16. Said holding portions 16 are conventional spectacle sidepieces. Between the two holding portions 16 a first pair of lenses 84 is provided. Said pair of lenses 84 comprises two lenses 86,88, each arranged in front of one eye, i.e. in one optical path. The two lenses 86,88 are connected with each other via a bridge 90.

A second pair of lenses 92 is arranged in front of the first pair of lenses 84, as seen in the line of sight, i.e. at a larger distance to the eyes. Said second pair of lenses 92 also comprises two lenses 94,96, each lens arranged in one optical path. Lens 94 is thus arranged in front of lens 86 and lens 96 in front of lens 88. The two lenses 94,96 of the second pair of lenses 92 are also connected with each other via a bridge 98.

For variable adjustment of the distance between the two pairs of lenses 84,92 in the direction indicated by arrow 100 the second pair of lenses 92 is connected with fastening elements 102. The two fastening elements 102 are connected with the pair of lenses 92 on the outside of the lenses. Thus the fastening elements 102 are connected with the two lenses 94,96 of the second pair of lenses 92 such that they are arranged at the largest distance possible to each other.

In the embodiment described the fastening elements 102 have a round cross-section. The holding portions 16 also have a round cross-section into which the fastening elements 102 are adapted to be inserted. The fastening elements 102 can thus be easily displaced in the direction indicated by arrow 100 and are guided in the holding portion 16. Thus the second pair of lenses 92 is securely connected with the holding portions 16 of the frame such that the position of the second pair of lenses 92 is defined and wobbling of the two pairs of lenses relative to each other is prevented. For this purpose a clamping screw 104 can be additionally provided on the holding portion 16 of the frame.

With regard to connection of the second pair of lenses 92 with the holding portions 16 of the frame it is of particular importance that the fastening elements are guided over a long distance on or in the holding portions 16. For example, the fastening elements may be configured such that they at least partially embrace the holding portions 16 from outside or from the top thus allowing displacement.

Preferably, the fastening elements 102 are removably connected with the second pair of lenses 92 such that said fastening elements 102 are adjustable to different holding portions 16 in that different fastening elements 102 are provided for the pairs of lenses 92.

Although preferred embodiments of the invention have been specifically illustrated and described herein, it is to be understood that minor variations may be made in the device without departing from the spirit and scope of the invention, as defined in the appended claims.

What is claimed is:

1. An ocular comprising a magnifying device including first and second pair of lenses (22, 24; 22, 24) defining respective first and second substantially parallel optical paths, a frame (14, 16) defined by a holding portion (16) for holding the ocular on a human head and a supporting portion (14) for supporting said first and second pair of lenses (22, 24; 22, 24), means (40, 60) for separately and independently snap-attaching and detaching said first and second pair of lenses (22, 24; 22, 24) relative to said supporting portion (14) in individual sliding relationship thereto, each of said snap-attaching and detaching means (40, 60) including at least a pair of fastening arms (42, 44; 64) defining a space there-between, at least one fastening arm of each pair of fastening arms (42, 44; 64) being constructed from resilient material to effect snap-attachment and detachment of said supporting portion (14) relative to said space, and said pair of fastening arms (42, 44; 64) being in at least partially embracing relationship to said supporting portion (14).

2. The ocular as defined in claim 1 including means (28, 32, 34; 66) for adjusting the distance between the lenses of each of said pair of first and second pair of lenses (22, 24; 22, 24).

3. The ocular as defined in claim 2, wherein said fastening means (64) are disposed in pairs with one pair being located on opposite sides of one of said optical paths and the other pair being located on opposite sides of the other of said optical paths.

4. The ocular as defined in claim 1 wherein said fastening means (64) are disposed in pairs with one pair being located on opposite sides of one of said optical paths and the other pair being located on opposite sides of the other of said optical paths.

5. The ocular as defined in claim 1, including means (28, 32, 34; 66) for adjusting the distance between the lenses of each of said pair of first and second pair of lenses (22, 24; 22, 24), and said distance adjusting means (28, 32, 34) includes at least one support element (32) carried by each of said snap-attaching and detaching means (40, 60).

6. The ocular as defined in claim 5, wherein said fastening means (64) are disposed in pairs with one pair being located on opposite sides of one of said optical paths and the other pair being located on opposite sides of the other of said optical paths.

7. The ocular as defined in claim 1, including means (28, 32, 34; 66) for adjusting the distance between the lenses of each of said pair of first and second pair of lenses (22, 24; 22, 24), and said distance adjusting means (28, 32, 34) each includes two support elements (28, 32) in relatively telescopic relationship to each other.

8. The ocular as defined in claim 7, wherein said fastening means (64) are disposed in pairs with one pair being located on opposite sides of one of said optical paths and the other pair being located on opposite sides of the other of said optical paths.

* * * * *